United States Patent [19]

Mantela

[11] 4,434,124
[45] Feb. 28, 1984

[54] METHOD FOR MAKING A RESILIENT TIE-DOWN DEVICE

[75] Inventor: Ralph F. Mantela, Union Lake, Mich.

[73] Assignee: General Motors Corporation, Detroit, Mich.

[21] Appl. No.: 469,255

[22] Filed: Feb. 24, 1983

[51] Int. Cl.³ .......................... B29C 6/00; B29D 3/02; B29H 3/00
[52] U.S. Cl. ................................................. 264/229
[58] Field of Search ............... 425/111; 264/229, 231, 264/275

[56] References Cited

U.S. PATENT DOCUMENTS

| | | | |
|---|---|---|---|
| 2,859,936 | 11/1958 | Warnken | 264/229 |
| 2,929,755 | 3/1960 | Porter | 264/229 |
| 3,056,167 | 10/1962 | Knoppel | 425/111 |
| 3,294,887 | 12/1966 | Altermatt | 264/229 |
| 3,434,181 | 3/1969 | Benzies | 264/229 |
| 3,477,895 | 11/1969 | Sauer | 264/231 |
| 3,634,572 | 1/1972 | Richmond et al. | 264/231 |
| 3,732,347 | 3/1973 | Hunt | 264/231 |
| 3,741,695 | 6/1973 | Yavorsky et al. | 264/231 |
| 4,083,838 | 4/1978 | Breher | 264/231 |

Primary Examiner—Willard E. Hoag
Attorney, Agent, or Firm—Edward J. Biskup

[57] ABSTRACT

A method of making a resilient tie-down device which includes the steps of providing a strap made of woven material, forming a loop portion in each end of the strap, and pretensioning and encapsulating the strap within a jacket of elastomeric material.

3 Claims, 11 Drawing Figures

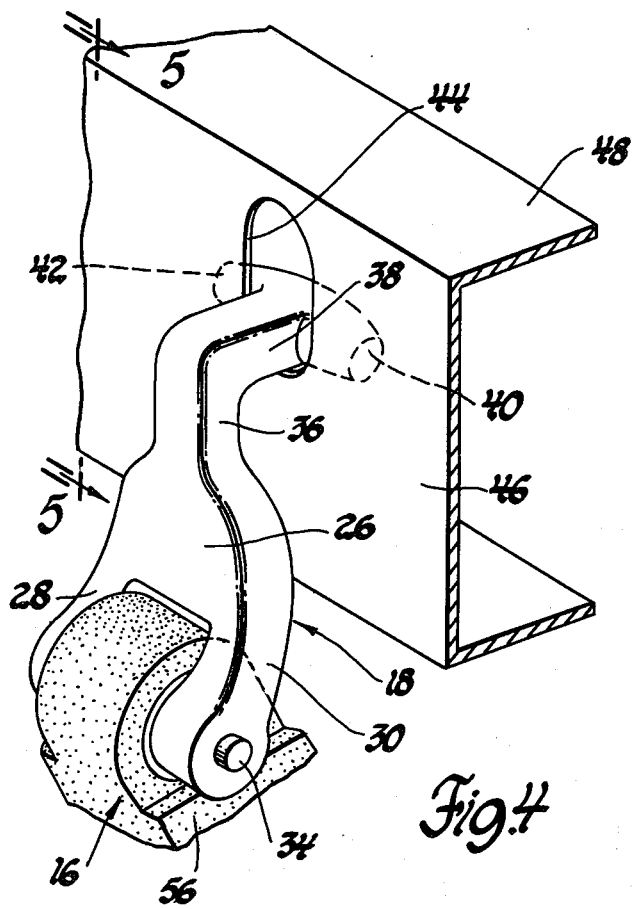
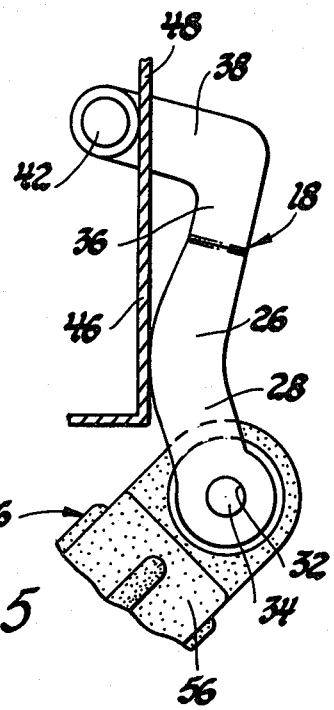
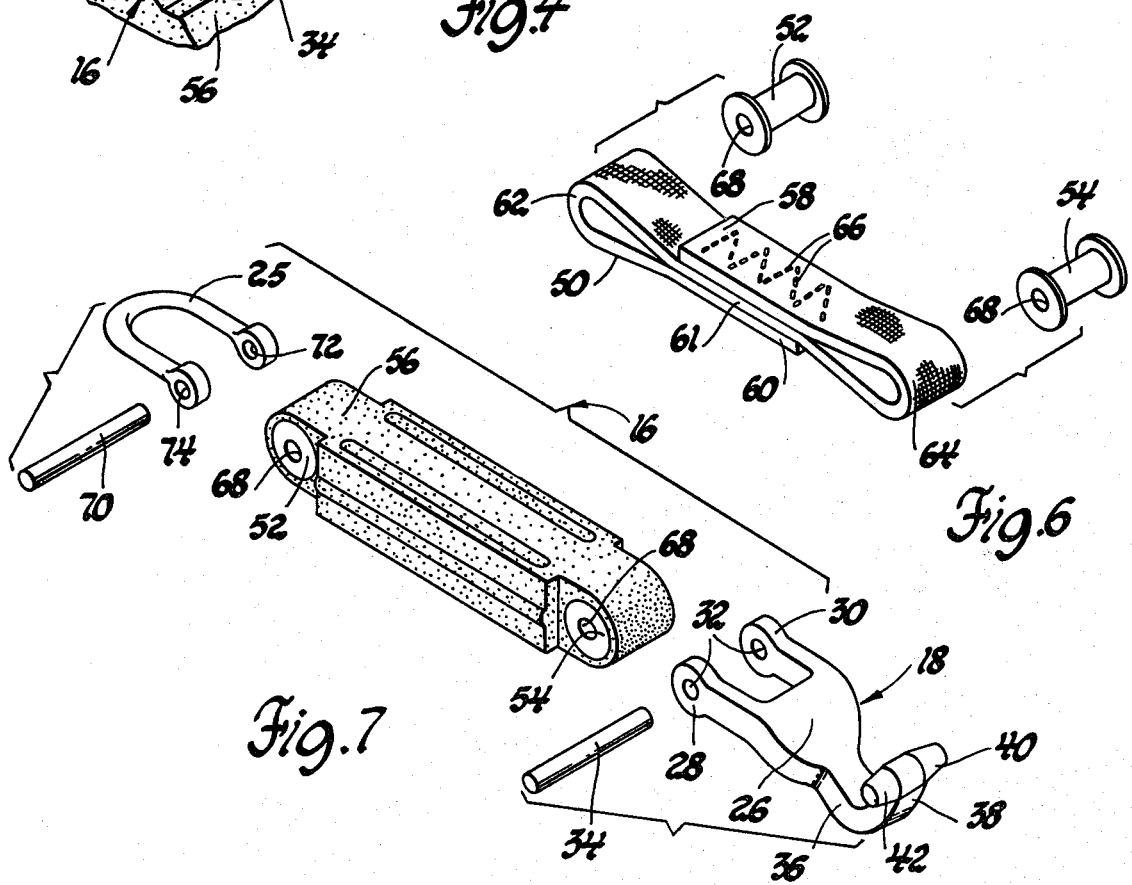

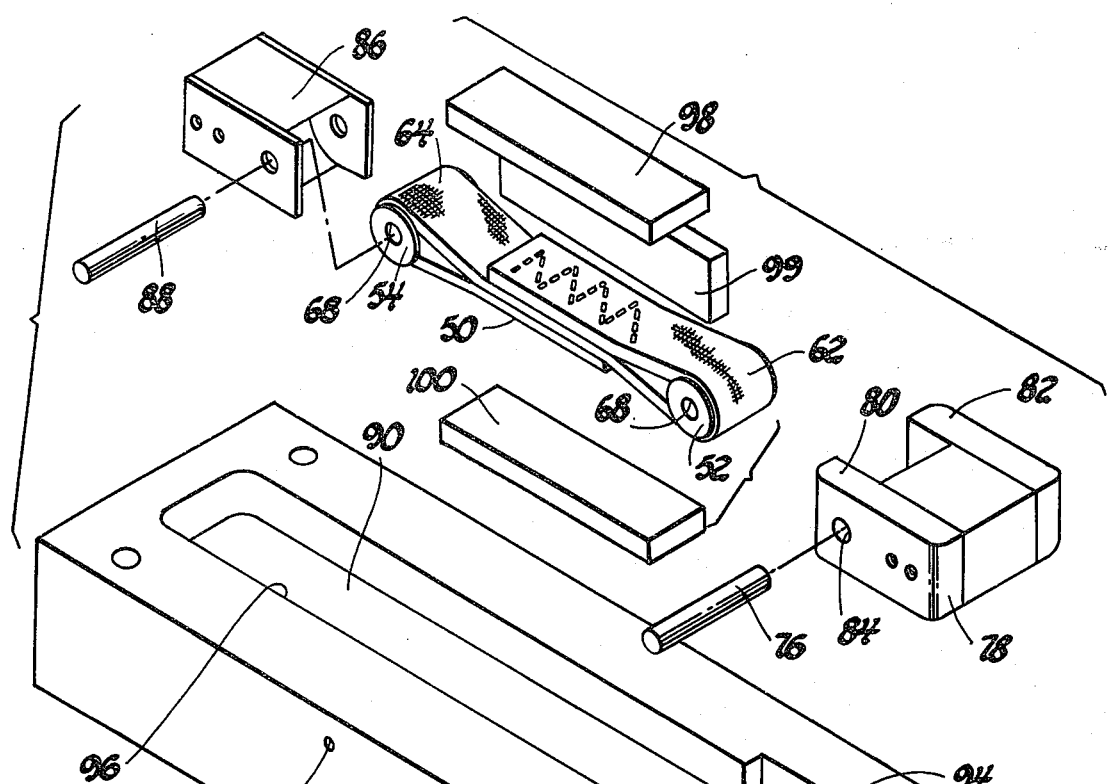
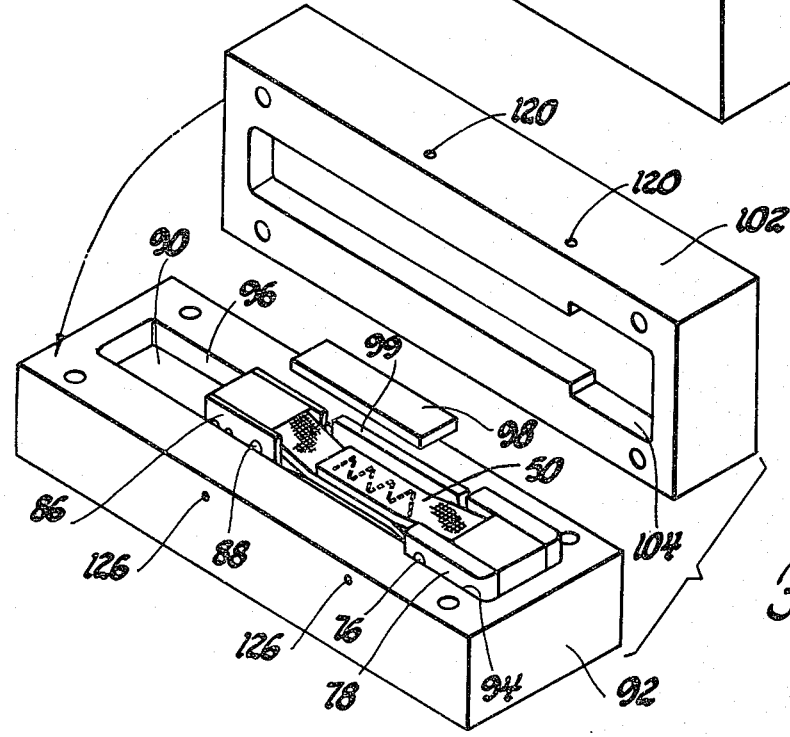

METHOD FOR MAKING A RESILIENT TIE-DOWN DEVICE

This invention concerns restraint systems and more particularly relates to a method for making a resilient tie-down device for securing automobiles and the like to a transporter such as a railway car.

Automotive vehicles shipped on transporters are frequently subjected to relatively high inertial forces during movement of the transporter. This is particularly true in the case of a railway car transporter which is started in motion by a "jerking" action on the part of the locomotive and at times travels along irregular road beds and misaligned rails. Under such conditions the railway car experiences erratic sidewise and other movement with resultant high load concentrations on the tie-down system holding the vehicle in place.

The current method of restraining vehicles on a transporter uses a tie-down system consisting of four chain assemblies connecting the vehicle frame to the transporter at points adjacent to the vehicle wheels. Each chain assembly includes a hook, which fits into a mating slot of the vehicle frame, a length of chain, and a capstan and rachet for anchoring and tightening the chain. It has been found that the tie-down system of this type tends to transmit large forces to the vehicle because the chain allows the vehicle suspension to compress with the chain going slack and afterwards pulling the chain taut when the vehicle rebounds. The present invention contemplates a method of making a resilient tie-down device which can be located in series with the tie-down chain connected to the vehicle transporter and the hook connected to the vehicle frame. The resilient tie-down device provides compliance in the restraint system which filters high frequency forces normally transmitted through the chain and eliminates impacts due to chain slack action. In the preferred form, this is accomplished by having the resilient tie-down device formed with a strap which is pretensioned and encapsulated within a jacket of elastomeric material. The strap takes the form of a webbing and forms a pair of loop portions each of which receives a guide spool member. The guide spool member at one end of the strap is pivotally connected to the hook while the guide spool member at the other end of the strap is pivotally connected to the chain by a clevis. In this manner, the vehicle is connected to the transporter and held thereon by the restraint system. At the same time the resilient tie-down device serves as a cushion to limit the shock loads created by inertial forces acting on the vehicle during the transit thereof.

The objects of the present invention are to provide a new and improved method of making a resilient tie-down device which includes a strap made of woven material for absorbing shock loads created by inertial movement of the vehicle; to provide a new and improved method of making a resilient tie-down device having a linear spring rate; to provide a new and improved method of making a resilient tie-down device which takes the form of a pretensioned strap encapsulated in a rubber jacket and interposed between the hook and chain so as to filter high frequency forces normally transmitted through the chain to the vehicle; to provide a new and improved method of making a resilient tie-down device having a pretensioned webbing formed with loop portions at opposite ends thereof which connect one end of the webbing to a hook and the other end to a chain; and, to provide a new and improved method of making a resilient tie-down device which can be interposed between a hook adapted to be connected to a vehicle frame and a chain adapted to be connected to a transporter and characterized in that the resilient tie-down device includes a webbing which is pretensioned and encapsulated in a rubber jacket with the opposite ends of the webbing interconnected so as to provide a pair of loop portions one of which is connected through a guide spool member to the hook and the other end of which is connected through a guide spool member to the chain.

Other objects and advantages of the present invention will be apparent from the following detailed description when taken with the drawings in which:

FIG. 4 is an enlarged perspective view showing the hook of FIGS. 2 and 3 connected to the vertical side wall of a vehicle frame;

FIG. 5 is a side view of the hook taken on Line 5—5 of FIG. 4;

FIG. 6 is an exploded view showing the strap and the guide spool members incorporated in the resilient tie-down device shown in FIGS. 1 through 3;

FIG. 7 is an exploded view of the hook, the resilient tie-down device and a clevis and the pins which pivotally interconnect these members to form a part of the restraint system shown in FIG. 1;

FIG. 8 is a perspective view showing the strap and guide spool members of the resilient tie-down device of FIG. 6 prior to being placed into one part of a mold used for tensioning and encapsulating the strap within an elastomeric material;

FIG. 9 shows the strap and the guide spool members located within the cavity of the one part of the mold and the other part of the mold positioned for mating engagement therewith;

Figure 1:
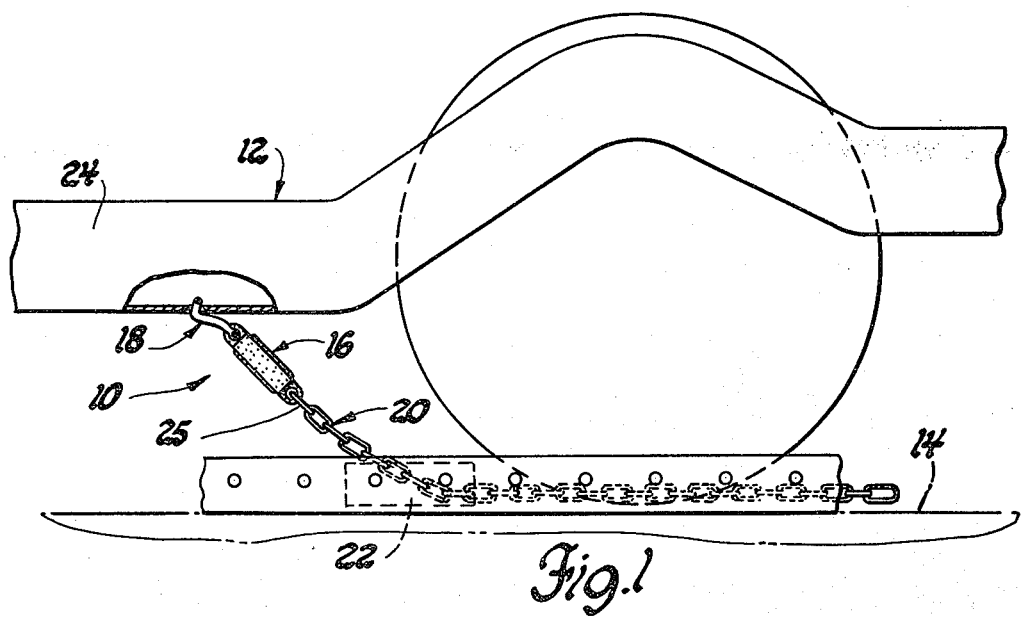
FIG. 1 is a fragmentary side elevational view of the vehicle secured to a transporter by a restraint system incorporating a resilient tie-down device made in accordance with the present invention.

Referring to the drawings and more particularly FIG. 1 thereof, a restraint system 10 is shown which serves to secure a vehicle 12 to the deck 14 of a transporter and incorporates a resilient tie-down device 16 made in accordance with the present invention. In general, the restraint system 10 comprises the resilient tie-down device 16, a hook device 18 and a chain 20 which passes through an idler assembly 22 and is connected to the usual capstan and rachet (not shown) for anchoring and tightening the chain 20. The resilient tie-down device 16 is in series with and interposed between the hook device 18 and the chain 20, and one end of the hook device 18, as seen in FIG. 1, is connected to the lower horizontal surface of the vehicle frame 24 while the other end of the hook device 18 is pivotally connected to the resilient tie-down device 16. The tie-down device 16, in turn, is pivotally connected to a clevis 25 which forms a part of the chain 20. Although not shown, it will be understood that a restraint system such as described above is intended to be located adjacent to each of the four wheels of the vehicle 12 for securing the latter to the deck 14 of the transporter.

Figure 3:
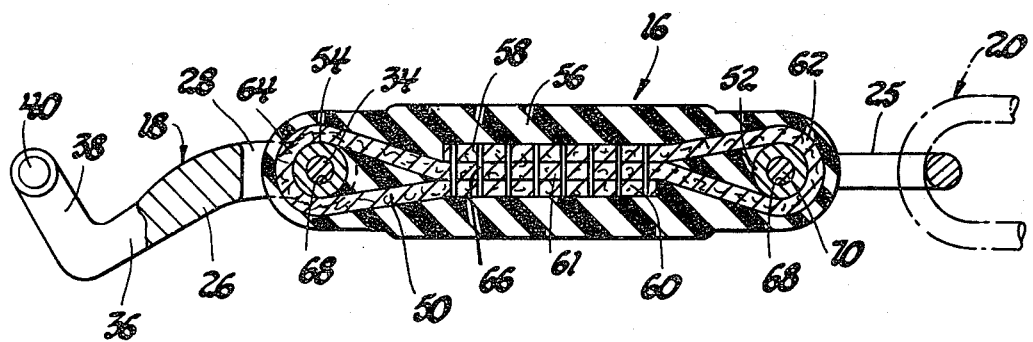
FIG. 3 is a sectional view taken on Line 3—3 of FIG. 2.
Figure 10:
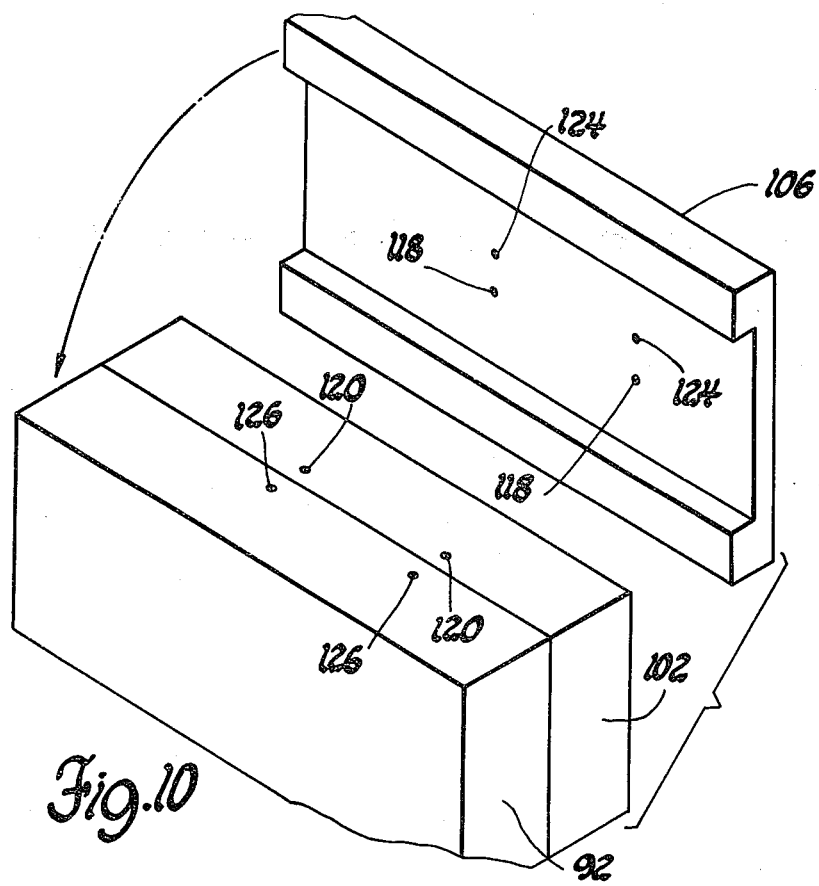
FIG. 10 shows the two parts of the mold assembled and a top retainer plate positioned for mating engagement with the upper portion of the mold; and, FIG. 11 is a cross sectional view of the assembled mold located within a press and combined with a molding pot containing an elastomeric material to be injected into the cavity of the mold.

More specifically, the hook device 18, which forms a part of the restraint system 10, includes a keystone-shaped body portion 26 integrally formed with a pair of laterally spaced and transversely aligned legs 28 and 30. As seen in FIG. 3, each of the legs 28 and 30 are located in a plane angled relative to the central plane of the body portion 26 of the hook device 18. Each leg 28 and 30 has an aperture 32 formed therein for receiving one end of a pin 34 which extends through one end of the resilient tie-down device 16 and serves as a pivotal connection means therebetween.

The body portion 26 of the hook device 18 is also formed with a gooseneck which, as seen in FIGS. 2, 4, 5, and 7, consists of a first neck portion 36 integral with the body portion 26 and a second neck portion 38 which is angularly displaced relative to the first neck portion 36 at an angle of approximately 90°. The first neck portion 36 of the gooseneck has the longitudinal center axis thereof substantially aligned with the central plane of the body portion 26 as seen in FIG. 3. The free end of the second neck portion 38 of the gooseneck is integrally formed with a pair of members 40 and 42 which project laterally outwardly from the opposite sides of the free end of the second neck portion 38. Each of the members 40 and 42 are substantially conical in configuration and together define a head which is adapted to be inserted into an oblong slot and rotated 90° for connecting the hook device 18 to a vehicle. In this regard and as seen in FIG. 1, the head of the hook device 18 is located in a slot formed in the lower horizontal plate portion of the vehicle frame 24. An alternate method of connecting the hook device 18 to the frame of a vehicle is seen in FIGS. 4 and 5 wherein the head (defined by members 40 and 42) of the hook device 18 is shown located in a slot 44 formed in the vertical plate portion 46 of a frame 48. In this case, the body portion 26 of the hook device 18 contacts the outer surface of the vertical plate portion 46 and serves as a load-bearing member for distributing the load and preventing stress concentrations in one small area of the frame.

Referring now to FIGS. 2, 3, 6, and 7 of the drawing, the resilient tie-down device 16 comprises a pretensioned strap 50 and a pair of identical guide spool members 52 and 54 all of which are encapsulated in a jacket 56 made of elastomeric material such as rubber. The strap 50 consists of an elongated webbing made from a high tenacity yarn such as Nylon 66. As seen in FIGS. 3 and 6, the opposite ends 58 and 60 of the webbing are doubled over and connected to the intermediate portion 61 of the webbing so as to form a pair of loop portions 62 and 64. The overlapped joint formed by the ends 58, 60 and the intermediate portion 61 of the webbing are stitched together with a nylon sewing thread 66 with sufficient stitches per inch so as to provide a minimum breaking strength of 9,000 pounds when the strap 50 is subjected to tensile loading. Preferably, the stitching is applied across the length of the overlapped joint in a zigzag path to form several laced patterns and the ends of the stitching can be backstitched to provide increased strength.

Figure 2:
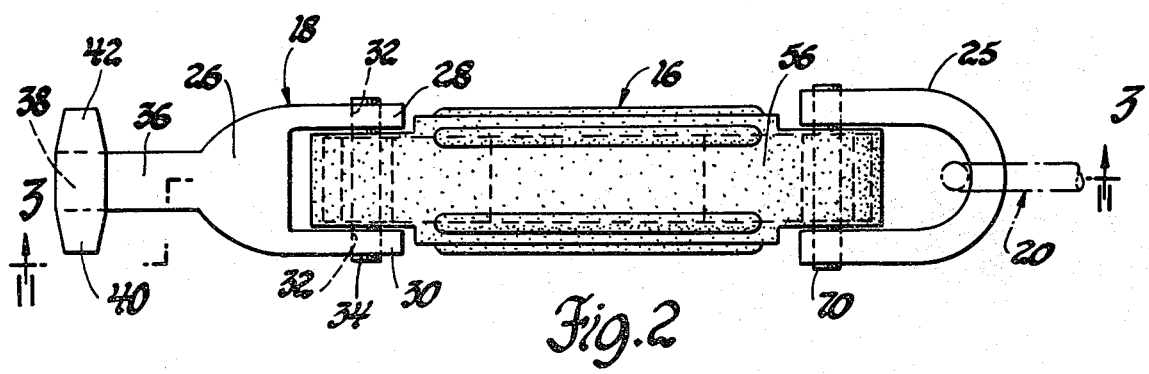
FIG. 2 is an enlarged plan view of the resilient tie-down device shown in FIG. 1 with one end of the tie-down device connected to a hook and the other end connected to a clevis.

The respective loop portions 62 and 64 accommodate the guide spool members 52 and 54 each of which is made of metal and has an axial bore 68. As best seen in FIGS. 2 and 3, the bore 68 of the guide spool member 54 located in the loop portion 64 receives the pin 34 extending between the legs 28 and 30 of the hook device 18 so as to provide a pivotal connection between the hook device 18 and the guide spool member 54. Similarly, the bore 68 of the guide spool member 52 located in the loop portion 62 receives a pin 70 the ends of which are located within the accommodating bores 72 and 74 formed in the clevis 26 connected to the chain 20. As will be explained more fully hereinafter, the strap 50 is pretensioned and encapsulated in the rubber jacket 56 which serves to resist wear, abrasion, cutting, as well as chemicals encountered during rail shipping of a vehicle.

In this regard, a method of pretensioning and encapsulating the strap 50 in an elastomeric material is shown in FIGS. 8–11. In practicing the method, initially the guide spool members 52 and 54, which are preferably made from steel, are coated with an adhesive so as to insure that a proper adhesion is realized between the elastomeric material, the webbing, and each guide spool member. An adhesive that may be used for this purpose is manufactured by Lord Corporation Erie, Pa. and is identified as CHEMLOK 236-A-E.

The guide spool members 52 and 54 are then inserted within the loop portions 62 and 64, respectively, of the strap 50 as seen in FIG. 8. As aforementioned, the strap 50 should be made from a high tenacity city yarn. A strap identical to strap 50 that has been found to provide the desired strength and yield characteristics is manufactured by Daal Specialties Limited, 611 Third Streeet, Collingwood, Ontario and is identified as No. N-11-080-24. The webbing used in the strap made by Daal Specialties Limited is made of a Nylon 66 yarn, has a width of 24 mm., a thickness of 6 mm., and a weight per linear meter of 95 grams. The overall length of the webbing prior to being doubled-over and sewn together to form the loop portions 62 and 64 as shown in FIGS. 3 and 6 was 393 mm. The over-lapped joints measure 63.5 mm. and were sewn together using a zig-zag pattern by a thread identified as CSB554 Bonded 100% Nylon so as to provide a minimum breaking strength of 9,000 lbs.

After the guide spool members 52 and 54 are inserted into the loop portions 62 and 64 of the strap 50, the guide spool member 52 is connected by a pin 76 to a support member 78. This is accomplished by first having the guide spool member 52 positioned between the arms 80 and 82 of the support member 78 and inserting the pin 76 through a bore 84 in arm 80 into the bore 68 of the guide spool member 52 and then into a bore (not shown) in arm 82. In the same manner, the guide spool member 54 of the loop portion 64 is connected to a support member 86 by a pin 88 as seen in FIG. 8.

Figure 11:
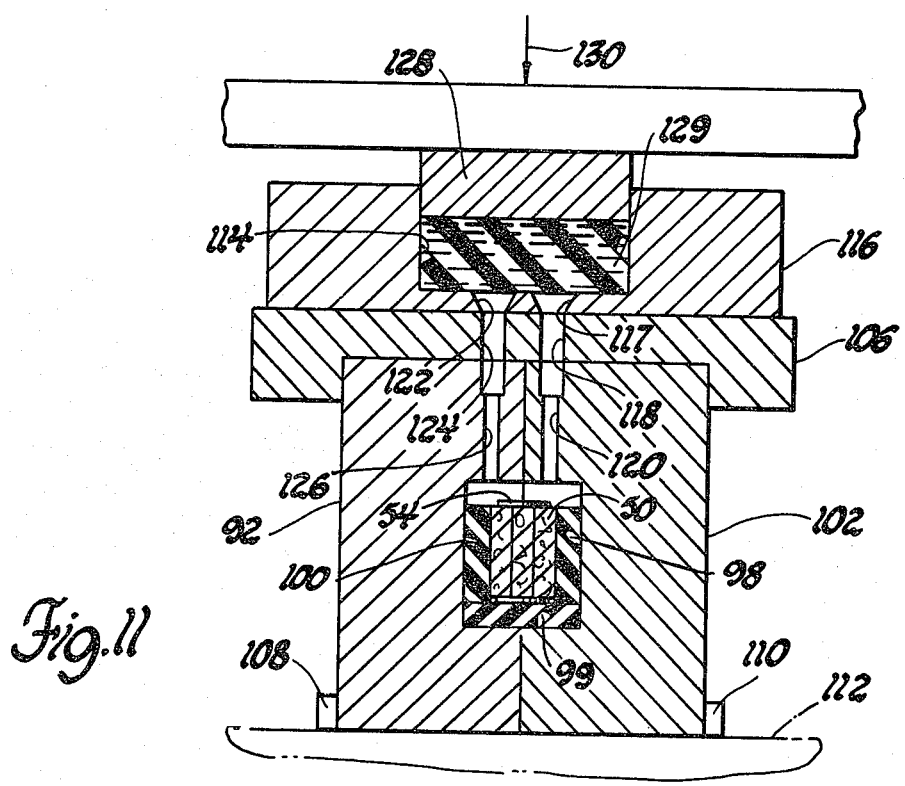

The entire assembly which includes the strap 50, guide spool members 52 and 54, and the connected support members 78 and 86, is then placed as seen in FIG. 9 into a cavity 90 formed in the lower half 92 of a mold with the support member 78 being positioned within an enlarged portion 94 of the cavity 90 while the support member 86 is located in a narrow, elongated portion 96 of the cavity 90. The enlarged portion 94 of the cavity 90 serves to fixedly retain the support member 78 while the narrow portion 96 provided lateral support and prevents sidewise movement of the support member 86 but allows sliding movement thereof along the longitudinal axes of the narrow portion 96. At the same time the strap 50 and the attached support members 78 and 86 are positioned in the cavity 90, three filler members 98, 99 and 100 made of elastomeric material and each having a slab configuration are located in the cavity 90 with the filler member 98 being located below the strap 50, filler member 99 being located to one side of the strap 50, and the filler member 100 located above the strap 50 as seen in FIGS. 8 and 9. The three filler members 98, 99 and 100 serve to maintain the sewn overlapped joints or mid-section of the strap 50 centrally located in the cavity 90 during the molding operation. After the filler members 98, 99 and 100 are placed in the cavity 90, the upper half 102 of the mold, which is a mirror image of the lower half 92 and is formed with an identical cavity 104, is placed on the lower half 92 of the mold as seen in FIG. 9 to close the mold. A top retainer plate 106, shown in FIG. 10, then serves to lock the upper portion of the two halves 92, 102 of the mold together and the mold is ready for positioning in a press. When the mold is placed in the press, as seen in FIG. 11, the upper portion of the mold is held together by the top retainer plate 106 while the lower portion of the mold is maintained in position by stops 108 and 110 mounted on the base 112 of the press. Also, a molding pot, in the form of a cylindrical cavity 114 formed in a body portion 116 is located on top of the retainer plate 106. The molding pot is connected to the cavity of the mold halves 92, 102 via aligned passages 117, 118, 120 and aligned passages 122, 124, and 126.

Prior to the molding operation, an elastomeric material 129, which preferably is the same in composition as the composition of the filler members 98, 99 and 100, is placed into the molding pot and subsequently the molding pot is covered with a plunger 128. Once the elastomeric pot 129 is placed into the molding pot and the mold is located in the press as shown in FIG. 11, the molding pot is heated to a temperature which melts the elastomeric material 129 and sufficient force is then applied to the plunger 128 in the direction of the arrow 130 causing the melted elastomeric material 129 to be injected via the passages 117, 118, 120 and passages 122, 124, and 126 into the cavity of the mold to form the jacket 56 around the strap 50. The temperature as well as the pressure on the plunger is maintained until the jacket of elastomeric material is cured. After the jacket is cured, the two halves 92 and 102 of the mold are disassembled and the completed resilient tie-down device is detached from the support members 92 and 102, trimmed and is ready for use in the restraint system 10 described hereinbefore.

In practicing the method as described above to form the jacket 56, an elastomeric material that has been used and has provided excellent results was a 50 DUROMETER EPDM rubber. It was found that a temperature of approximately 310° F. would melt the rubber and the force needed to be applied to the plunger during the injection operation was approximately 30 tons. Also, the rubber was fully cured after maintaining temperature and pressure for 25 minutes.

It will be noted that, both support members 78 and 86 are sized so as to completely fill the area of the cavity where each support member is located when, the mold is closed. Also, inasmuch as the support member 78 is fixed in the enlarged portion 94 of the cavity 90 of the mold while the support member 86 is slidably mounted in the narrow portion 96, when the melted elastomeric material is injected into the mold under pressure, the pressurized material causes the slidable support member to move away from the support member 78 so as to place the strap 50 in tension. The tension within the strap 50 is maintained while the elastomeric material cures in the mold and after the completed tie-down device is removed from the mold, the pretensioned strap serves to place the jacket 56 in compression. It has been found that making the tie-down device 16 by a method as described above, results in a tie-down device that has a linear spring rate.

Finally, it will be noted that the filler members 98, 99 and 100 can be eliminated if the mold is positioned in the press so that the longitudinal axis of the mold is located in the vertical plane with the enlarged portion 94 of the cavity positioned adjacent to the melting pot. By so doing the weight of the support member 86 will pull down on the strap 50 and cause it to be centrally located in the cavity of the mold. Of course, in this position of the mold, passages would have to be provided in the support member 78 and the adjacent wall of the mold along the longitudinal axis thereof for allowing the elastomeric material to flow into the cavity therein.

Various changes and modifications can be made in the above-described invention without departing from the spirit of the invention. Accordingly, the inventor does not wish to be limited except by the scope of the appended claims.

The embodiments of the invention in which an exclusive property or privilege is claimed are defined as follows:

1. A method of making a resilient tie-down device for a restraint system which serves to secure a vehicle to the support platform of a transporter, said method comprising the steps of providing a strap made of a woven material, providing a loop portion at each end of the strap, placing said strap in a mold, connecting one loop portion of said strap to a fixed support member in said mold and connecting the other loop portion of said strap to a movable support member in said mold, closing said mold and injecting elastomeric material therein under pressure so as to cause said movable support member to move away from said fixed support member and place said strap in tension while in said mold, curing said elastomer while said strap is under tension and removing said strap from said mold after said elastomeric material has cured so that said pretensioned strap maintains said elastomeric material in compression.

2. A method of making a resilient tie-down device for a restraint system which serves to secure a vehicle to the support platform of a transporter, said method comprising the steps of providing a strap made of a woven material, interconnecting the opposite ends of said strap so as to form a loop portion at each end of the strap, placing said strap in a mold, connecting one loop portion of said strap to a fixed support member in said mold and connecting the other loop portion of said strap to a movable support member in said mold, closing said mold and injecting elastomeric material therein under pressure so as to cause said movable support member to simultaneously move away from said fixed support member and tension said strap, curing said elastomer while said strap is under tension and removing said strap from said mold after said elastomeric material has cured so that said pretensioned strap maintains said elastomeric material in compression.

3. A method of making a resilient tie-down device for a restraint system which serves to secure a vehicle to the support platform of a transporter, said method comprising the steps of providing a strap made of a woven material, placing the opposite ends of said strap at the mid-section thereof so as to form a loop portion at each end of the strap, securing said ends of said straps to said mid-section, placing said strap in a mold, inserting a guide spool member into each loop portion, connecting the guide spool member in one loop portion of said strap to a fixed support member in said mold and connecting the guide spool member in the other loop portion of said strap to a movable support member in said mold, closing said mold and injecting elastomeric material therein under pressure so as to cause said movable support member to move away from said fixed support member and tension said strap, curing said elastomer while said strap is under tension and removing said strap from said mold after said elastomeric material has cured so that said pretensioned strap maintains said elastomeric material in compression.

* * * * *